US007840620B2

(12) United States Patent
Vignoli et al.

(10) Patent No.: US 7,840,620 B2
(45) Date of Patent: Nov. 23, 2010

(54) HIERARCHICAL PLAYLIST GENERATOR

(75) Inventors: Fabio Vignoli, Veldhoven (NL); Steffen Clarence Pauws, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 406 days.

(21) Appl. No.: 10/597,277

(22) PCT Filed: Jan. 17, 2005

(86) PCT No.: PCT/IB2005/050184
§ 371 (c)(1),
(2), (4) Date: Jul. 19, 2006

(87) PCT Pub. No.: WO2005/071570
PCT Pub. Date: Aug. 4, 2005

(65) Prior Publication Data
US 2008/0256032 A1 Oct. 16, 2008

Related U.S. Application Data

(60) Provisional application No. 60/537,802, filed on Jan. 20, 2004.

(51) Int. Cl.
*G06F 17/00* (2006.01)
*G06F 17/30* (2006.01)

(52) U.S. Cl. .............................. 707/999.104; 707/705; 707/706; 707/707; 707/709; 707/710; 707/736; 707/737; 707/754

(58) Field of Classification Search ...................... None
See application file for complete search history.

(56) References Cited

U.S. PATENT DOCUMENTS 5,886,698 A 3/1999 Sciammarella et al.
6,006,218 A * 12/1999 Breese et al. ................. 707/3
6,526,411 B1 2/2003 Ward
6,594,654 B1 * 7/2003 Salam et al. .................. 707/3
2002/0019858 A1 2/2002 Kaiser et al.
2002/0045960 A1 4/2002 Phillips et al.
2002/0072982 A1 * 6/2002 Barton et al. ................ 705/26
2002/0138630 A1 9/2002 Solomon et al.
2003/0191753 A1 * 10/2003 Hoch ........................... 707/3

FOREIGN PATENT DOCUMENTS

WO 0135667 A1 5/2001

OTHER PUBLICATIONS

Abe Hideo, System for Automatic Selection of Music, Method for Automatic Selection of Music and Storage, Patent Abstracts of Japan, Publication No. 2002-073041, Publication Date Mar. 12, 2002.
Website http://www.gracenote.com/gn_products/playlist.html, Gracenote Playlist, Dec. 1, 2003.
J. Aucouturier et al, Scaling Up Music Playlist Generation, Proceedings of 2002 IEEE International Conference on Multimedia and Expo, ICME, Lausanne, Switzerland, vol. 1, Aug. 26, 2002, pp. 105-108.

* cited by examiner

*Primary Examiner*—Yicun Wu
*Assistant Examiner*—Yu Zhao

(57) ABSTRACT

A playlist generator implements a net-based playlist generation process that comprises a multi-stage, hierarchical process. At a highest hierarchical level, the playlist generator applies parameters corresponding to a user's "general" preferences, wherein the parameters are relatively constant. At a lower level of the hierarchy, the playlist generator applies parameters corresponding to the user's "specific" preferences, wherein the parameters are dynamic time-dependent or event-dependent. The playlist generator uses the high-level parameters to generate a subset of material from a global collection of material, and applies the lower-level preferences to this subset of material in response to a change in the user's immediate preferences.

21 Claims, 1 Drawing Sheet

HIERARCHICAL PLAYLIST GENERATOR

CROSS REFERENCE TO RELATED APPLICATION

This application claims the benefit of U.S. provisional application Ser. No. 60/537,802 filed Jan. 20, 2004, which the entire subject matter is incorporated herein by reference.

This invention relates to the field of entertainment systems, and in particular to a playlist generator that distinguishes between general and specific preferences.

Playlists define a subset of entertainment selections, such as songs, videos, multimedia segments, and so on, for subsequent rendering via a corresponding rendering device or system.

A playlist generator facilitates the creation of a playlist. For ease of reference, the invention is presented in the context of a playlist generator that creates a playlist of songs. One of ordinary skill in the art will recognize that the principles presented herein are independent of the type of material being playlisted. Conventionally, a playlist generator receives a set of user preferences, and applies this set of preferences to a collection of material to identify selections in the collection that satisfy the set of preferences. The preferences may define songs that are to be included or excluded from the playlist, particular genres or styles, and so on, and may define a song to be used as a seed to find similar songs. To create a different playlist, a user modifies the preferences and submits this modified set of preferences to the playlist generator.

Generally, a selection process based on user preferences is not an "absolute" filtering process; often the user's preferences do not form a necessarily coherent or consistent set of criteria. For example, a user may indicate a preference for guitar music, ballads, and female vocalists. This does not necessarily imply that the user would not be interested in a guitar ballad performed by a male vocalist, or would not be interested in a ballad by a female vocalist without guitar backup. Most preference-based selection processes, therefore, use some form of weighted averaging to score each song relative to the given set of preferences, and songs that achieve a score above a given threshold value are identified as the songs that correspond to a user's preference. In the above example, a guitar ballad performed by a female vocalist would likely score highly, but other preferred characteristics may cause the guitar ballad performed by a male vocalist to score higher, and thus be more preferable to the user.

Alternative schemes, including rule-based systems, neural networks, and the like, are similarly based on providing a measure of correspondence between the characteristics of each song and the given user preferences, and identifying those having the best measure of correspondence.

Hundreds of thousands of songs are currently available for legal downloading via the Internet, and the number is expected to continue to substantially increase. When a user initially submits a set of preferences to a song-searching playlist generator, the user typically receives a very large playlist, and must subsequently refine his/her preferences until the playlist size becomes manageable and/or usable. This iterative process is not always straightforward and/or productive, because the effects of a change of preference cannot easily be predicted, particularly in the context of a multi-parameter playlist generator. Often, the iterative changing of a variety of preference parameters results in a playlist that lacks any sense of unity or coherency. For example, a user may have previously identified a preference that effectively caused a particular group of songs to be excluded, but a new preference may affect the scoring scheme so as to reintroduce songs from this group of previously excluded songs back into the proposed playlist.

When the user next desires a different playlist, for example, due to a change in the user's mood or environment, the user either starts from scratch and progressively adds preference constraints until a desired playlist size is achieved, or, the user modifies the prior set of preferences in an attempt to maintain a reasonably sized playlist with some variety compared to the previous playlist. In either event, these playlist generation processes can be very time consuming, as each iterative playlist generation is achieved by applying the revised set of preferences to the hundreds of thousands of songs. Also, because each new set of preferences is applied to the entirety of the collection of songs, a modification that a user intends to further limit the selection process may, in fact, introduce additional selections into the playlist.

Automatic playlist generators based on vague preferences are intended to alleviate such difficulties. However, when the collection of material increases in size, the complexity of the task increases substantially, and the time to search and process the collection becomes excessive. To address the complexity issue, a class of playlist generators, commonly termed "recommenders", have been developed that provide playlists based on user's "tastes", rather than particular preferences, wherein a user's taste is defined as long-term characteristics, such as a general like for "rock and roll", "jazz", and so on. However, playlists based on these general characteristics are often not coherent, and may not be consistent with the user's current mood or environment.

It is an object of this invention to provide a playlist generator that is scalable for efficiently generating playlists from ever-increasing collections of available material. It is a further object of this invention to provide a playlist generator that easily accommodates changes to a person's immediate preferences.

These objects and others are achieved by a playlist generator the partitions the playlist generation process into a multi-stage, hierarchical process. At an example highest hierarchical level, the user's "general" preferences are applied. These general preferences reflect the user's long-term tastes, and are relatively constant. At a lower level of the hierarchy, the user's "specific" preferences are applied. These specific preferences reflect the dynamic time-dependent or event-dependent aspects of a user's entertainment preferences. The high level preferences generate a subset of material from the global collection of material, and the lower level preferences are applied to this subset of material as the user's immediate preferences change. By segregating the playlist generation process hierarchically, efficiency is gained by applying immediate preference changes to a smaller subset of material, and coherency is improved by limiting the subsequent selection processes to a given subset of the material.

The drawings are included for illustrative purposes and are not intended to limit the scope of the invention. In the drawings.

Throughout the drawings, the same reference numerals indicate similar or corresponding features or functions.

Figure 1:
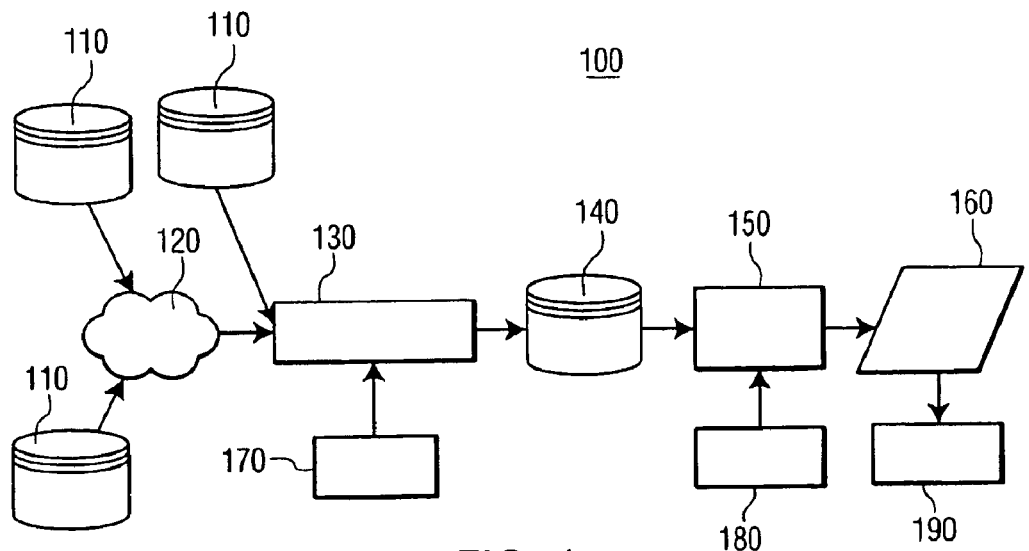
FIG. 1 illustrates an example block diagram of a hierarchical playlist generator in accordance with this invention.

The playlist generator 100 (i.e., apparatus 100) of FIG. 1 includes at least two selectors, 130, 150 (i.e., selector devices 130 and 150), that are configured to select material (via Net 120, for example, an Internet) from one or more sources 110

(e.g., databases of content material) to form a playlist 160 via a sequential filtering process. Optionally, the playlist generator 100 may also include a rendering device 190 for rendering the material identified in the playlist 160 (e.g., a rendering device 190 for playing a song identified in the playlist), or the playlist 160 may be provided to a separate rendering system. Although only two selectors 130, 150 are illustrated in FIG. 1, one of ordinary skill in the art will recognize that multiple selectors may be placed in a sequential path between sources 110 of content material and the generated playlist 160, in view of this disclosure.

A first selector 130, hereinafter termed a "recommender", is configured to access (e.g., directly or via Net 120 as illustrated in FIG. 1) the one or more sources 110 of content material (e.g., databases of content material), or indexes to the one or more sources 110, to select a subset of the available content material, based on a first set of preferences 170 of a user. The first set of user preferences or parameters can include time-independent user preferences or parameters. In addition, the first set of user preferences or parameters can include event-independent user preferences or parameters. In one embodiment of this invention, the first set of preferences 170 correspond to the general "tastes" of the user. These tastes are typically the time-invariant (e.g., time-independent or event-independent) preferences of the user. For example, a particular user may generally like rock-and-roll, country, and classical music, and generally dislike jazz and folk music. That is, although at particular times, or during particular events, this user may prefer country over classical music, this user's general tastes (e.g., time-independent or event-independent) includes both country and classical music; but rarely, if ever, will a time or event arise when this user's preference for music ever include jazz or folk music. In like manner, a user may generally like one particular artist, and absolutely dislike another artist, regardless of the genre of the song that these artists record. Similarly, a user may have a general preference or aversion to songs that include drum-solos.

To create the preferences, the user is provided a means for identifying his/her general likes and dislikes (not illustrated), typically via an interactive questionnaire. Although the above examples are presented in terms of absolute likes and dislikes, the questionnaire can be structured in the form of a weighting system, such as "on a scale of 0 to 10, please identify your preferences for each of the following". Alternatively, or additionally, the tastes of a user may be deduced by observing the selections of content material by the user over an extended period of time, under a variety of circumstances.

The recommender 130 is configured to select content material from the one or more sources 110, or indexes to sources 110, that satisfy the general tastes of the user, to form a subset 140 of identifiers of the content material in the sources 110 that satisfy the user's general tastes 170. Because the user's general tastes include the user's preferences regardless of a particular time or circumstance, the subset 140 can be expected to include a fairly substantial portion of the available material from the sources 110. For example, in a typical Internet-based environment wherein hundreds of thousands of songs are available for inclusion in the playlist 160, the subset 140 may include thousands or tens of thousands of songs that satisfy a particular user's general tastes 170.

Of particular note, due to the sequential nature of the selectors 130, 150, material that does not satisfy the user's general tastes 170 are not included in the subset 140, and thus are not available for selection by the selector 150, regardless of subsequent user preferences 180, discussed below. This high-level or coarse filtering of the available material from the sources 110, provides for efficient processing by the subsequent selector 150, and also eliminates the possibility of a subsequent selection including material that does not conform to the user's general tastes.

The subsequent selector 150, or series of subsequent selectors, selects a further subset of identifiers of material from the subset 140, based on a second set of user preferences 180. These user preferences 180 are generally time-dependent, or event-dependent, or merely based on a particular mood of the user at the time the playlist 160 is generated. For example, a user who generally likes rock-and-roll may prefer not to hear rock-and-roll in the early morning hours. In like manner, a user who likes rock-and-roll and country music may further refine the selection to include only romantic songs for a playlist intended for use during a romantic event. Similarly, particular music characteristics may be preferred for playlists intended for the dinner hour, and other characteristics for playlists intended for driving in rush-hour traffic.

As noted above, because the second selector 150 applies the set of preferences 180 to the subset 140 that conforms to the user's general tastes, the risk of including unwanted material in the playlist 160 is considerably reduced compared to a conventional single-stage playlist generator. For example, in a conventional system a user may specify that he/she does not prefer jazz, but because the filtering is based on a composite of preferences, this no-jazz preference may be overcome by an expressed preference for items such as "instrumentals", "strong beat", "horns", and so on, for a particular occasion or particular mood of the user. In the embodiment of FIG. 1, the no-jazz preference will typically be applied at the higher-level selector 130, and the event-specific or mood-specific preference for the particular set of music characteristics will be included in the specific time-dependent or event-dependent preferences 180. As such, because the subset 140 is formed based on the general "no-jazz" preference, the subset 140 will not contain jazz selections. Thereafter, regardless of the inclusion of particular music characteristics in the specific preferences 180, the playlist 160 cannot contain jazz selections.

Figure 2:
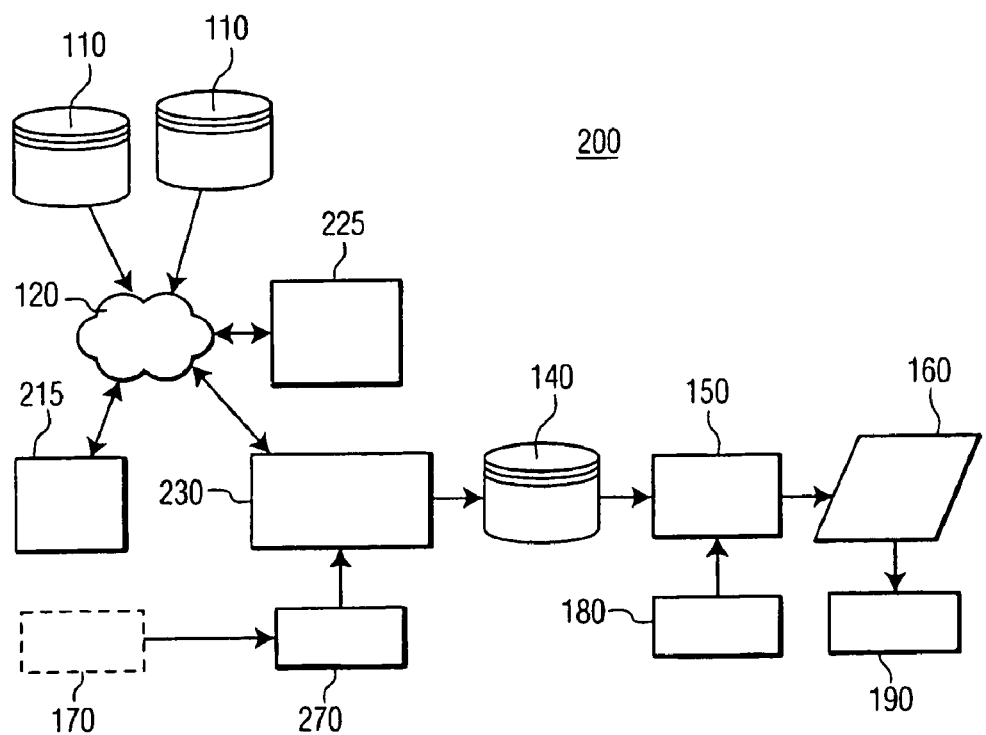
FIG. 2 illustrates an example block diagram of another hierarchical playlist generator in accordance with this invention.

Although the invention has been presented using the paradigm of a recommender module 130 that provides a first subset of selections based on a user's general preferences, one of ordinary skill in the art will recognize that other schemes may be used. For example, FIG. 2 illustrates a hierarchical playlist generator 200 that includes a recommender module 230 that is configured to search for songs that are currently popular, wherein popularity is defined in terms of the number of times other users have accessed each song during a given time period (i.e., based upon a frequency of access of the items within the source of material). Accordingly, in one embodiment, the playlist generator is configured wherein the first set of user preferences includes one or more parameters for searching the source of material based on a frequency of access of the items within the source of material, and the first selector is configured to determine a measure of requests for each item within the source material by a plurality of users, and to provide therefrom the first subset of identification of items, based on the measure of requests for each item.

In FIG. 2, a song-finder 215 is illustrated to represent one or more web-based applications that multiple users 225 use to access available content material in the sources 110. The popularity logger module 230 in the user's system 200 accesses the song-finder 215 to determine the popularity of songs, based on the number of accesses to each item in the sources 110 via the source-finder 215 within a given time period.

In this embodiment, the user's preferences 270 include parameters for filtering the sources 110 for popular songs, and may include, for example, a time duration (previous day, previous week, previous month, etc.) for determining the tally of the number of requests for each song, a minimum number of accesses to qualify as a 'popular' song, and so on. The user is also provided the option of specifying the extent of the list, in terms of the number of songs that are to be included in the popular sublist 140. Typically, in a system wherein the sources 110 contain hundreds of thousands of songs, a user will configure the logger 230 to identify a few thousand popular songs, so that a sufficient variety is obtained for subsequent filtering based on the user's specific preferences, discussed further below.

Optionally, depending upon the extent of the records maintained at the song-finder 215, the logger module 230 may be configured to determine the popularity of songs among a given subset of the users of the song-finder 215. In such an embodiment, the user of the system 200 identifies general tastes, such as "rock-and-roll", "jazz", "classical", and so on, as discussed above, and the popularity logger module 230 determines the songs that were most requested by other users who have tastes in common with the user's tastes. Similarly, the user preferences 270 can include the user's general tastes 170, so that the logger module 230 includes only songs that fit the user's general tastes 170 in the popular sublist 140. That is, for example, if the user's taste includes country-swing and rock-and-roll, the logger 230 can optionally be configured to report the N most-popular songs that are classified as either country-swing or rock-and-roll, wherein most-popular is determined by the number of times the song has been requested by a user in a given time period. Similarly, the user can identify classifications of songs that should be specifically excluded from consideration in forming the popular list 140, such as not-Jazz, or not-Madonna, etc.

Note that by structuring the popular list 140 based on the user's general tastes, the popular list 140 is not dependent upon a predetermination of which material to classify as 'popular', as in conventional internet-radio and other playlist generators. As such, the popular list 140 can be as narrowly-defined or broadly-defined as the user prefers. For example, a user may request the most popular hard-rock songs, the most popular piano concertos, the most popular Italian folk songs, the most popular children songs, and so on. In like manner, by structuring the popular list 140 based on requests by other users, the popular list 140 will likely automatically include seasonal-appropriate songs, new songs from particular artists, and so on.

The selector 150 is configured to generate the playlist 160 from the popular list 140, based on the user's specific preferences 180 for the particular playlist, as detailed above. If the user's general tastes 170 are not reflected in the songs selected by the popularity logger 230, these general preferences may be included in the preferences 180, or these general preferences may be included in a mid-level of the hierarchical scheme illustrated in FIG. 2, to generate an intermediate list, after the popular list 140, and the selector 150 will be configured to select the songs for the playlist 160 from this intermediate list, based on the user's specific preferences 180.

In a typical embodiment of this invention, the subset 140 is stored in non-volatile storage, so that multiple playlists 160 can be generated from this subset 140 as the user desires. For example, the system 100 (i.e., apparatus 100) may be configured to apply the selector 130/230 to the available sources 110 (e.g., databases of material) on a weekly basis, to keep the subset 140 relatively up to date. During the week, the user applies the selector 150 (e.g., via a second or third set of user preferences or parameters) to the subset 140 to generate playlists 160 as required. Because the subset 140 is a collection of identifiers that is substantially smaller than a collection of identifiers of all of the material at the sources 110, and because the subset 140 is typically generated at the user's system (i.e., apparatus 100), the repeated operations of the selector 150 (e.g., via a second or third set of user preferences or parameters) is substantially more efficient than the conventional repeated operation of a single-stage selector that searches the entire collection at the sources 110. Accordingly, the playlist generator includes non-volatile memory configured to store the first subset of identifications. In addition, the second selector of the playlist generator is further configured to search the first subset of identifications, based on a third set of user preferences or parameters, to provide therefrom a third subset of identifications of items within the source of material, to form another playlist that facilitates subsequent rendering of the items identified in the third subset.

As noted above, the selector 150 may include multiple sequential selectors. For example, a recommender based on general tastes may follow the aforementioned popular-song recommender 230 to provide a multi-tiered filter process before the selector 150 is applied to select songs based on current preferences 180. In like manner, a selector may be configured to create a sub-subset from the subset 140 based on the time-of-day, and then another selector is configured to create the playlist 160 from this sub-subset based on the user's current mood during this time-of-day. In this manner, the user need not repeatedly enter the time-of-day preferences for each change of current mood. These and other techniques for organizing preferences and selectors in a hierarchical manner will be evident to one of ordinary skill in the art in view of this disclosure.

The foregoing merely illustrates the principles of the invention. It will thus be appreciated that those skilled in the art will be able to devise various arrangements which, although not explicitly described or shown herein, embody the principles of the invention and are thus within its spirit and scope. For example, a user may create a collection of preference files, such as "general", "romantic", "lively", "dinner", "blues", and so on, and may selectively apply these preferences in a sequential manner. By applying the preferences in a sequential manner and thereby generating progressively smaller subsets, the user is able to generate a progressively more selective playlist without the risk of a particular preference introducing a divergent search result. In like manner, although the invention is presented herein with the "general" preferences being applied first, at the highest level, and the "specific" preferences applied subsequently, the system can be configured to allow the user to select the particular order of preference selection. These and other system configuration and optimization features will be evident to one of ordinary skill in the art in view of this disclosure, and are included within the scope of the following claims.

The invention claimed is:

1. A playlist generator apparatus comprising:
    a first selector device connected all the time with at least one database source of material of an Internet-based environment, wherein the first selector device accesses and searches the at least one database source of material and provides therefrom a first subset of identifications of items within the at least one database source of material at a highest hierarchical level, based on a first set of parameters corresponding to a first set of user preferences, further wherein the first selector device accesses and searches the at least one database source of material on a weekly basis to maintain the first subset of identifications of items up to date, the first subset of identifications of items being stored in a database of the playlist generator, and a second selector device operatively coupled subsequent to the first selector device via the database of the playlist generator, wherein the second selector device searches the first subset of identifications stored in the database of the playlist generator at a lower hierarchical level based on a second set of parameters corresponding to a second set of user preferences, and provides at an output of the second selector device a second subset of identifications of items within the at least one database source of material, wherein the second subset corresponds to a playlist that is used by a rendering device for a subsequent rendering of the items identified in the second subset.

2. The playlist generator apparatus of claim 1, wherein
the first set of parameters comprise parameters corresponding to time-independent user preferences, and
the second set of parameters comprise parameters corresponding to user preferences at a particular time.

3. The playlist generator apparatus of claim 1, wherein
the first set of parameters comprise parameters corresponding to event-independent user preferences, and
the second set of parameters comprise parameters corresponding to user preferences based upon an occurrence of an event.

4. The playlist generator apparatus of claim 1, wherein
the first set of parameters comprise parameters corresponding to general user preferences, wherein the general user preferences include constant preferences, and
the second set of parameters comprise parameters corresponding to specific user preferences, wherein the specific user preferences include dynamic time-dependent or event-dependent entertainment preferences.

5. The playlist generator apparatus of claim 1, wherein
the database source of material includes one or more Internet web-sites.

6. The playlist generator apparatus of claim 1, further including
wherein the database of the playlist generator includes non-volatile memory that stores the first subset of identifications, and wherein
the second selector device further searches the first subset of identifications at the lower hierarchical level, based on a third set of parameters corresponding to a third set of user preferences, and provides at an output of the second selector device a third subset of identifications of items within the database source of material, wherein the third subset corresponds to another playlist that is used by a rendering device for a subsequent rendering of the items identified in the third subset.

7. The playlist generator apparatus of claim 1, wherein
the first set of parameters includes one or more parameters for searching the database source of material based on a frequency of access of the items within the database source of material, and
the first selector device is further configured to determine a measure of requests for each item within the database source of material by a plurality of users, and to provide therefrom the first subset of identifications of items, based on the measure of requests for each item.

8. The playlist generator apparatus of claim 7, wherein
the first selector device is further configured to provide the first subset of identifiers based on a set of parameters corresponding to general user preferences, and
wherein the second set of parameters corresponds to specific user preferences.

9. The playlist generator apparatus of claim 7, wherein
the first selector device is further configured to provide the first subset of identifiers based on a set of parameters corresponding to general user preferences, and
the second set of parameters corresponding to user preferences based upon a particular event.

10. The playlist generator apparatus of claim 7, further including
wherein the database of the playlist generator includes non-volatile memory that stores the first subset of identifications, and wherein
the second selector device further searches the first subset of identifications at the lower hierarchical level, based on a third set of parameters corresponding to a third set of user preferences, and provides at an output of the second selector device a third subset of identifications of items within the database source of material, wherein the third subset corresponds to another playlist that is used by a rendering device for a subsequent rendering of the items identified in the third subset.

11. A system comprising:
a playlist generator apparatus that provides a set of identifications of select items within at least one database source of material of an Internet-based environment, and
a rendering device, operably coupled to the playlist generator apparatus, wherein the rendering device renders the select items in response to the set of identifications of the select items;
wherein
the playlist generator apparatus includes:
a first selector device connected all the time with the at least one database source of material of the Internet-based environment, wherein the first selector device accesses and searches the at least one database source of material and provides therefrom a first subset of identifications of items within the at least one database source of material at a highest hierarchical level, based on a first set of parameters corresponding to a first set of user preferences, further wherein the first selector device accesses and searches the at least one database source of material on a weekly basis to maintain the first subset of identifications of items up to date, the first subset of identifications of items being stored in a database of the playlist generator, and
a second selector device operatively coupled subsequent to the first selector device via the database of the playlist generator, wherein the second selector device searches the first subset of identifications stored in the database of the playlist generator at a lower hierarchical level based on a second set of parameters corresponding to a second set of user preferences, and provides at an output of the second selector device the set of identifications of the select items.

12. The system of claim 11, wherein
the first set of parameters includes parameters corresponding to time-independent user preferences, and
the second set of parameters includes parameters corresponding to user preferences at a particular time.

13. The system of claim 11, wherein
the database source of material includes one or more Internet web-sites.

14. The system of claim 11, further including
wherein the database of the playlist generator includes non-volatile memory that is configured to store the first subset of identifications, and wherein the second selector device is operatively coupled to the non-volatile memory to facilitate generation of multiple sets of identifications of select items at the lower hierarchical level based on the first subset of identifications at the first hierarchical level.

15. The system of claim 11, wherein
the first set of parameters includes one or more parameters for searching the database source of material based on a frequency of access of the items within the database source of material, and
the first selector device is further configured to determine a measure of requests for each item within the database source of material by a plurality of users, and to provide therefrom the first subset of identifications of items, based on the measure of requests for each item.

16. The system of claim 15, wherein
the first selector is further configured to provide the first subset of identifiers based on a set of parameters corresponding to general user preferences, and
wherein the second set of parameters corresponds to a set of specific user preferences.

17. A method of generating a playlist in an entertainment system, comprising:
accessing and searching via a first selector device, connected all the time with at least one database source of material of an Internet-based environment, the at least one database source of material at a highest hierarchical level based on a first set of parameters corresponding to a first set of user preferences to provide thereby a first subset of identifications of items within the at least one database source of material, wherein accessing and searching further include accessing and searching the at least one database source of material on a weekly basis to maintain the first subset of identifications of items up to date, the first subset of identifications being stored in a database of the entertainment system, and
generating the playlist from the first subset of identifications of items stored in the database of the entertainment system, wherein generating includes searching via a second selector device, coupled subsequent to the first selector device via the database of the entertainment system, the first subset of identifications at a subsequent hierarchical level based on a second set of parameters corresponding to a second set of user preferences, and to provide at an output of the second selector device a second subset of identifications of items within the at least one database source of material, wherein the second subset corresponds to the playlist that is used by a rendering device for a subsequent rendering of the items identified in the second subset.

18. The method of claim 17, wherein
the first set of parameters includes parameters corresponding to substantially time-invariant user preferences, and
the second set of parameters includes parameters corresponding to user preferences at a particular time.

19. The method of claim 17, wherein
the first set of parameters includes one or more parameters for searching the database source of material based on accesses to the items within the database source of material, and
searching the database source of material further includes
determining a frequency of access of each of a plurality of items within the database source of material, and
selecting the identifications of items for inclusion in the first subset of identifications based at least in part on the frequency of access of each of the plurality of items.

20. The method of claim 19, wherein
selecting the identifications of items for inclusion in the first subset is also based on parameters corresponding to substantially time-invariant user preferences, and
the second set of parameters includes parameters corresponding to user preferences at a particular time.

21. The method of claim 17, further including
generating another playlist from the stored first subset of identifications of items, based on a further set of parameters.

* * * * *